Oct. 14, 1952 W. C. DAVIS 2,614,110
RECOVERY OF OIL AND MEAL FROM OIL-BEARING MARINE LIFE
Filed June 6, 1947 5 Sheets-Sheet 3

INVENTOR
WALTER C. DAVIS
BY Hugo G. Kernman
ATTORNEY

Patented Oct. 14, 1952

2,614,110

UNITED STATES PATENT OFFICE 2,614,110

RECOVERY OF OIL AND MEAL FROM OIL-BEARING MARINE LIFE

Walter C. Davis, Tredyffrin Township, Chester County, Pa., assignor to The Sharples Corporation, a corporation of Delaware Application June 6, 1947, Serial No. 752,916

10 Claims. (Cl. 260—412.1)

This invention pertains generally to the processing of fish for the recovery of solids and oil therefrom, and pertains more particularly to the processing of whole fish and/or portions thereof, such as whole portions, for the above purposes.

In the conventional treatment of fish for the recovery of fish oil and for the production of a solid product which may be used, for example, as fertilizer or as animal or fowl feed, the raw fish parts, which may comprise all of the fish, the heads, tails, or other offal, or otherwise, are usually cooked with live steam. The cooked fish parts are then passed to a screw press for the recovery of meal and oil.

The meal discharged from the screw press may be used, after drying, for example, as fertilizer, or as animal or fowl feed.

The liquor from the screw press contains water, solids and oil. A large part of the solid matter is initially separated from this liquor such as by gravity settling, after which the liquor may be passed to a high speed centrifugal machine in which fish oil may be separated from water and residual solids.

Normally this conventional treatment is carried on in a series of steps requiring, besides screw press facilities, large holding tanks for use in the various steps of the process. This bulky equipment is costly to install and occupies considerable space. Furthermore, the screw press in this type of application requires frequent adjustment, and resulting in shut-downs for this purpose, and consequent loss of time which at times may be very considerable. Moreover, in this conventional process a sizable proportion of oil usually remains in the meal unless this residual oil is extracted from the meal such as by solvent extraction which is relatively expensive. High oil content meal is not considered desirable for use as cattle or fowl feed.

The present invention requires no bulky equipment, and yields a substantially larger proportion of separated oil than can be obtained by the use of a screw press. The process preferably is carried on in a closed system and may be completely continuous.

In practicing the present invention, raw whole fish and/or portions thereof, such as whole portions, heads, tails, livers, or other offal, etc. are cooked, and thereafter treated, preferably continuously, for the separation of solids from liquids. This separation may be accomplished by continuously feeding the cooked mass into a centrifugal machine in the operation of which solids are separated from liquid, and thereafter subjected to centrifugal force while disposed in a thin layer such as while being impelled to a zone closer to the axis of rotation than the zone of discharge of liquid and unseparated solids. The separated solids are thus wrung relatively dry of liquids and thereafter discharged from the machine relatively free from liquids. Thereafter the liquid and unseparated solids are treated, such as continuously, to separate water and oil from each other and from previously unseparated or residual solids. The latter separation may be accomplished by feeding the liquid and unseparated solids into a second centrifugal machine in the operation of which solids are discharged from a zone adjacent to the inside periphery of the bowl, while liquids, such as water and fish oil, are separately discharged from other zones of the bowl. If desired, such as for the further recovery of oil, and/or the recovery of meal having a higher protein content, or otherwise, solids and/or liquids discharged from either centrifugal machine, or both, and separately or in admixture, may be further treated, such as by recycling, or otherwise. For example, separated water containing protein and separated solids from the second separation step of the process, may be added to separated solids from the first separation step, and the resulting mixture processed to recover meal having a higher protein content. The term "fish" is employed herein in its broad sense and will be understood to include all oil-bearing marine life, portions thereof and other offal as described above.

Thus a feature of the present invention resides in the recovery of fish oil in high yields.

A further feature of the invention resides in the recovery of meal having a relatively low oil content and/or having a relatively high protein content.

A further feature of the invention resides in a simple and continuous process for the recovery of oil and solids from fish in which compact and continuously operating machinery is employed.

Another feature of this invention resides in the recovery of a relatively high yield of meal of feed quality from fish solids.

Further features and advantages of the invention will become apparent to those skilled in the art upon becoming familiar with the following detailed description and the attached drawings, in which.

Figure 1:
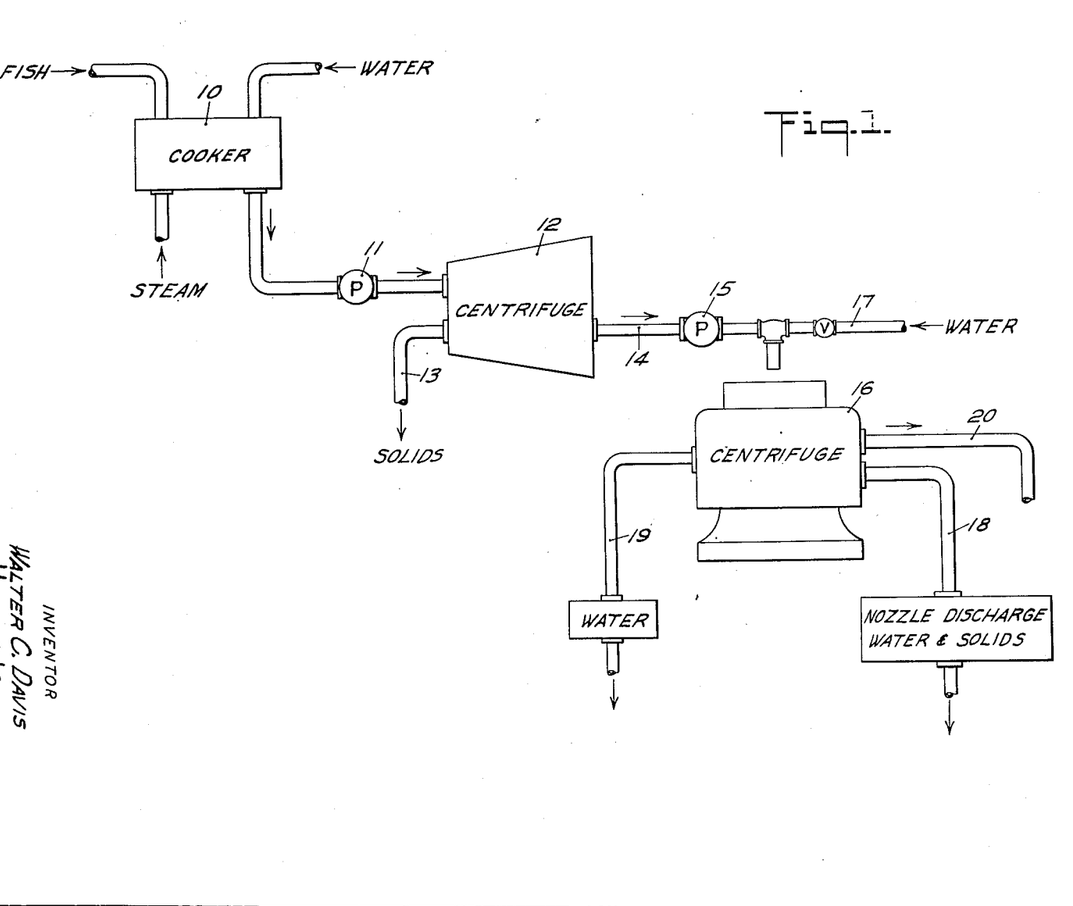
Figure 1 is a flow sheet illustrating one embodiment of the invention.

In the process diagrammatically illustrated in Figure 1, fish, which may be whole fish, portions of fish or any combination thereof, are fed into a cooker 10. This cooker which conveniently is of a continuous type may be heated with live steam or by any other suitable means. The fish are usually held in this cooker for a sufficient length of time and at a sufficiently high temperature to more or less completely cook the fleshy parts and to disintegrate the fish substantially. Conveniently, water, such as ordinary water, or stick-water to be hereinafter more particularly defined, or otherwise, may be added to the fish in the cooker to speed the cooking process and to aid in disintegration of the fish. The addition of water to the cooker is not a necessity, as in many instances fish themselves contain sufficient water for cooking, and in others the condensate from steam may add enough water, or conditions may be otherwise such as to make the addition of water to the cooker not essential. When water is added, stick-water which contains large amounts of soluble protein, and which is one of the products of the process, may be used. Since stick-water, which is normally discarded, contains considerable heat, heat will be thus saved in cooking, and as hereinafter more particularly set forth, meal of higher protein content may be recovered.

The cooked fish from the cooker 10 are passed, such as by means of pump 11, into a centrifugal machine 12 for the separation of solids from liquids. This machine may be of the general type illustrated in Figure 3 and described in detail hereinafter. In the operation of this machine, solids are separated from liquids and then centrifuged while disposed in a thin layer to separate further liquid therefrom. In an embodiment of a machine of this type, solids are impelled to and discharged from a zone closer to the axis of rotation than the zone of discharge of liquids and unseparated solids.

As illustrated, separated solids are conveyed from machine 12 through conduit 13, and liquids containing unseparated solids through conduit 14.

Liquids comprising water and oil, and unseparated solids from centrifugal machine 12 are passed, such as by pump 15 in conduit 14, to a second centrifugal machine 16. Machine 16 may be of the type illustrated in Figure 4 and described hereinafter. In machine 16, residual solids are separated from liquids by centrifugal force. Conveniently the zone of discharge of solids thus separated is adjacent to the inside periphery of the rotor. Liquids may be separately discharged from other zones of the rotor.

Additional water may be added to the material fed to centrifugal machine 16 if desired, such as illustrated at 17, or to the material fed to centrifugal machine 12, or both, if desired, and/or to the cooker 10, as illustrated, or otherwise, to increase the flow characteristics of the material fed to the machine, to reduce the oil content of the meal, to increase the recovery of oil, and/or otherwise.

For highly preferred operation of the process, to recover meal of relatively low oil content and oil in relatively high yield, the over-all material fed to centrifugal machine 12 should contain not more than approximately 18% by weight of solids, and preferably not more than approximately 15% by weight of solids. Since fish usually analyze approximately 20% solids and approximately 80% fluids (total oil and water), and rarely vary in solids content beyond the range of approximately from 18% to 22% solids, the addition of at least a certain minimum amount of water when necessary to reduce the percentage of solids present as indicated is highly desirable. Obviously, water may be added in excess of the amounts indicated, if desired, without harmful effect.

In fact it is preferred that water be added to the fish irrespective of their original composition, prior to the entry of the disintegrated cooked fish into the centrifugal machine 12, in an amount, based upon total solids in the original fish, of at least approximately 50% by weight, and preferably of at least approximately 100% by weight, such as, of at least approximately 150% by weight. This may take place in the cooker, in a disintegrator, in a slurry tank, at the pump and/or at any other suitable point, and/or manner.

For example, at least 10 lbs. of water is preferably added per 100 lbs. of total original fish, and preferably at least 20 lbs., such as at least 30 lbs., the original fish being calculated as 20% solids. Since fish are largely of this average solids content, and vary not widely therefrom, this formula for the addition of water may be followed, in view of its convenience, irrespective of the original composition of the fish.

Furthermore, for the recovery of meal of relatively low oil content and oil in relatively high yield, it is highly preferred that the temperature of the disintegrated cooked fish fed to the centrifugal machine 12 be at least approximately 90° F. and more particularly at least approximately 100° F., such as at least approximately 130° F., and that such temperature should not exceed approximately 170° F., and more particularly approximately 160° F., such as approximately 150° F.

Since the fish in the cooker 10 usually are brought to a considerably higher temperature during cooking, care is preferably taken to reduce the temperature to within one or more of the preferred ranges stated above, prior to the entry of the disintegrated cooked fish into the centrifugal machine 12.

It is also highly preferred that the effluent from centrifugal machine 12 be brought to a higher temperature, such as in a manner hereinafter to be more particularly described, prior to its entry into the centrifugal machine 16, such temperature being preferably at least approximately 180° F., and more particularly at least approximately 190° F., such as between approximately 200° F. and 210° F. The maximum temperature is, of course, the boiling point of the water present, which, at ordinary atmospheric pressure, is in the neighborhood of 212° F. While this reheating ordinarily takes place at atmospheric pressure, it will be understood that somewhat higher or lower pressures may be employed, if desired, for any reason, although temperatures around 215° F. or above, may tend to destroy the vitamin content of the oil, which may be objectionable when the oil is to be used for food or medicinal purposes. When the oil is to be used in paints, this may not be objectionable.

The reheating of the effluent from centrifugal machine 12, as above indicated, greatly assists in the efficient separation of the oil from this effluent in the centrifugal machine 16.

Moreover, it is highly preferred that the cooked fish fed to the centrifugal machine 12 be in the form of a pumpable or flowable slurry and that the disintegration of the cooked fish be such that at least 95%, by weight, thereof, will pass through a screen having square openings of approximately .625 by .625 inch, and more particularly, of .52 by .52 inch, and still more particularly a screen of 2½ mesh or a screen of 3 mesh. It is also highly preferred that the cooked fish shall not be disintegrated to such an extent that more than 5%, by weight, will pass through a screen of 250 mesh, and more particularly of 200 mesh, upon gentle vibration of the screen, it being understood that if pressure is applied to the disintegrated fish while on the screen, larger amounts may pass through due to further disintegration caused by the application of pressure.

A considerable amount of disintegration takes place in the cooker, particularly when the cooker is of the continuous type, and disintegration will also be effected by the pump 11, particularly when this pump is of a type adapted to effect disintegration, such as of the gear type. Also due to the disintegration and the flow of the disintegrated fish in the presence of water, a flowable or pumpable slurry is formed. However, and as hereinafter more particularly illustrated and described, a disintegrator and/or slurry-forming mechanism may be inserted between the cooker 10 and the centrifugal machine 12, if desired, to assist in the disintegration of the fish and/or the formation of a slurry thereof.

As illustrated, fish solids are discharged from centrifugal machine 16 (along with some water) through conduit 18. These solids, the same as the solids from machine 12, may be dried in a drier, not shown, and then used as fertilizer, or as feed for poultry or otherwise. As illustrated, water is discharged from centrifugal machine 16 through conduit 19. This water may be used as a source of supply of protein and/or as a source of heat, for example, as mentioned above. As illustrated, oil is discharged from centrifugal machine 16 through conduit 20. This oil is substantially free from water and solids.

Figure 2:
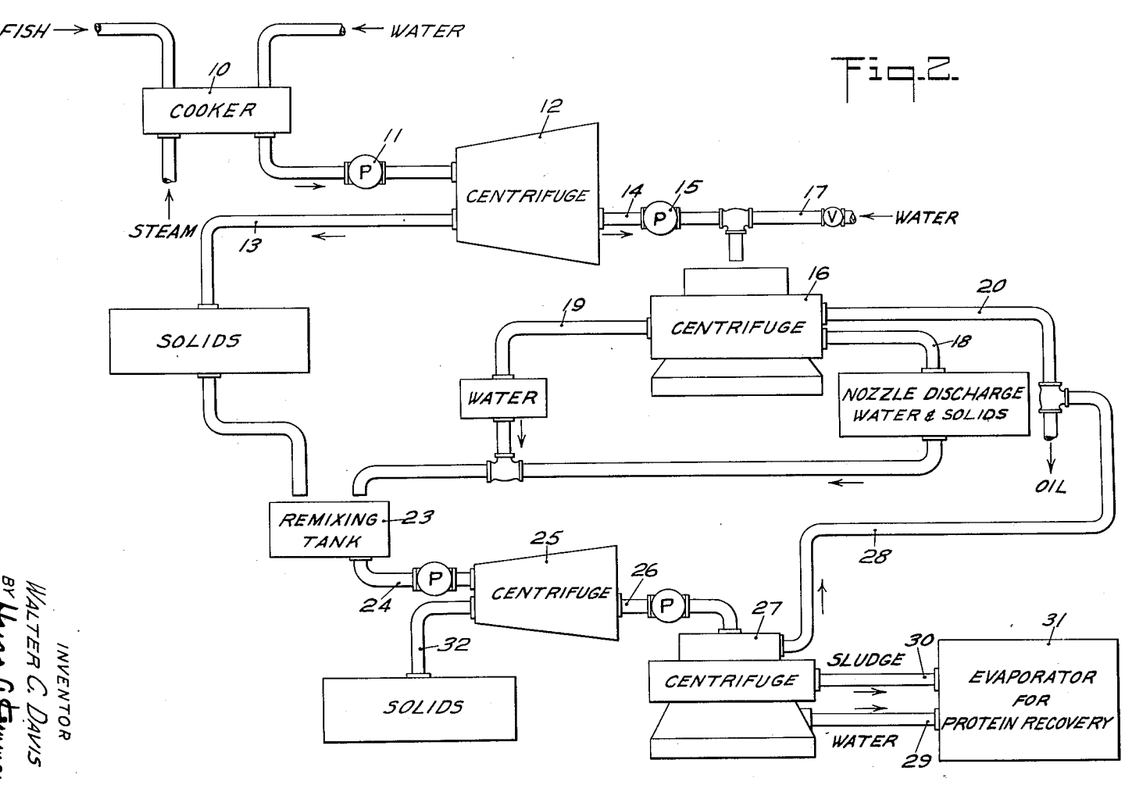
Figure 2 is a flow sheet illustrating another embodiment of the invention.

When it is desired to obtain a still greater recovery of oil from fish solids, or meal with a still higher concentration of protein, or meal with a still lower oil content, or for other reasons, the embodiment illustrated in Figure 2 may be employed.

In this embodiment, fish are fed to a cooker 10 as previously described. After a suitable period of cooking, the cooked fish are fed such as, continuously in the form of a slurry and at a preferred temperature, into centrifugal machine 12 for separation of solids from liquids.

From centrifugal machine 12 liquids and unseparated solids are passed, such as continuously and at a preferred temperature, into a centrifugal machine 16. A desired portion or all of the water discharged from centrifugal machine 16 through conduit 19, and a portion or all of the solids discharged (with some water) from centrifugal machine 16 through conduit 18, are passed, such as continuously, into a remixing tank 23 where they are mixed with a portion or all of the solids discharged through conduit 13 from the centrifugal machine 12.

The water discharged from centrifugal machine 16 through conduit 19 of Figure 1 or Figure 2 is known as stick-water, and a part or all of this water (usually a part only) may be recycled to the cooker 10 or to any other point in Figure 1 or Figure 2, such as, to a point between the cooker 10 and centrifugal machine 12, for the purposes previously described. Thus, if a portion is so recycled, the remainder may go to the remixing tank 23 to be remixed with the effluents delivered through conduits 13 and 18.

The constituents so remixed are passed, such as continuously and at a preferred temperature as mentioned above for the influent to centrifugal machine 12, through conduit 24 into a centrifugal machine 25, of a type similar to the centrifugal machine 12. The liquid and unseparated solids discharged from centrifugal machine 25 are passed, such as continuously and at a preferred temperature as mentioned above for the influent to centrifugal machine 16, through conduit 26 into a centrifugal machine 27 of a type similar to the centrifugal machine 16.

Oil discharged through conduit 28 from the centrifugal machine 27 is added to the oil discharged through conduit 20 from the centrifugal machine 16. This added oil, of course, results in a greater total yield of oil.

The water and solids or sludge discharged from the centrifugal machine 27 through conduits 29 and 30, respectively, may be treated, if desired, for recovery of their high protein content, such as in a suitable evaporator illustrated at 31.

The solids which are discharged through conduit 32 from the centrifugal machine 25 may be passed to a drier (not shown) to remove residual moisture and to prepare these solids as a meal for feed, or otherwise. These solids have a very low oil content, and are especially suited to be used as a high grade feed.

Figure 3:
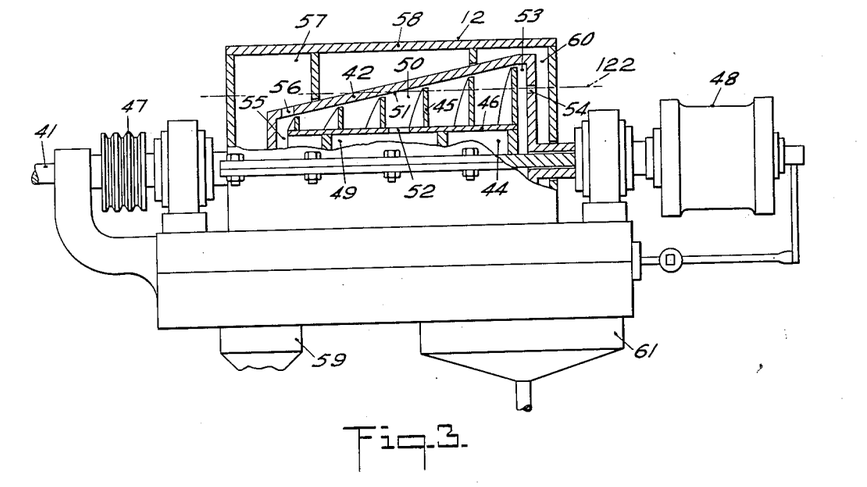
Figure 3 is a view with parts cut away and parts in section of one of the centrifugal machines which may be employed in the invention.

Centrifugal machine 12 (machine 25 being of similar construction) is of a well-known design and construction, which is more particularly illustrated in Figure 3. However, it is to be understood that centrifugal machine 12, or its equivalent, as described and/or illustrated in the drawings, may be of any other suitable design and/or construction capable of similarly processing the material fed thereto, many of which naturally will occur to persons skilled in the art, and to designers and others in the general field to which these and similarly functioning centrifugal machines pertain. A part or all of this processing may take place in one or more than one machine, as desired, and of the same or different design, construction and/or operation whether batch-wise, semi-continuous, continuous or otherwise. Thus my invention pertains to a process, and not to any particular machine or machines useful in accomplishing my purpose.

As shown, rotor 42 of centrifugal machine 12 is conical in shape, and encloses an impeller member 44, which, as shown, comprises a continuous screw 45 attached along its inner helical edge to a cylinder 46, with its outer edge of spiral shape so as to conform to the shape of the inner conical surface or wall 51 of the rotor 42, with which inner conical surface it coacts in the impelling of certain solids in a manner to be hereinafter more particularly described. In a centrifugal machine of this type a pulley 47, or other suitable connection to a source of power, is connected either to the rotor 42 or to the impeller 44, and both members are caused to rotate, but at a slightly different speed, such as at a difference of from 10 to 60 revolutions per minute, by virtue of being interconnected through a differential gearbox 48 of well-known design, construction and operation, or through any other suitable coupling, or device.

Material, fed into the rotor 42 through the conduit 41, reaches a chamber 49 inside the cylinder 46; it then passes into a zone of centrifugation 50 between cylinder 46 and the inner wall 51 of the rotor 42 through a series of openings 52 in the cylinder 46. Due to centrifugal force, generated by the rapid rotation of rotor 42 and its associated impeller member 44, and the relative rotational movement of screw 45 with respect to inner wall 51, certain of the fish solids are moved longitudinally and radially inwardly out of the liquid and then separated from contained and/or adhering water and oil while spread out in a thin layer. During this separation certain other solids, such as extremely finely divided fish meal remain in and are carried along with the water and oil.

Screw 45 may be either right-hand or left-hand in shape, that is, it may advance along cylinder 46 either clockwise or counter-clockwise, and it may, through its coupling to rotor 42, rotate either faster or slower than rotor 42. Furthermore, screw 45 and rotor 42 may rotate together in either direction, that is, either clockwise or counter-clockwise as seen from the gearbox 48. However, the shape of screw 45 and its relative rotation with respect to rotor 42 (by virtue of the characteristics of the coupling employed between screw 45 and rotor 42) are co-ordinated such as to tend to impel the material in the zone of centrifugation 50 to the left as seen in Figure 3 of the drawings, that is toward the discharge port 56.

In view of the conical shape of the inner wall 51 of rotor 42, on the other hand, the centrifugal force generated in the zone of centrifugation 50 increases toward the right as seen in Figure 3, tending to cause the material in said zone to flow to the right, that is toward the discharge port 54.

The liquor in the zone of centrifugation 50 builds up on wall 51 in a manner such as to have a more or less cylindrical shaped inner surface, the radial distance of which from the axis of rotation is determined for the most part by the position of the discharge port 54, of which there may be any desired number spaced circumferentially. In the usual commercial embodiments of machines of this type these discharge ports are made radially adjustable to increase or decrease their distance from the axis of rotation.

Due to the highly fluid character of the water and oil and the associated finely divided fish solids, the liquid and finely divided solids in admixture escape along the screw 45 to the right, as seen in Figure 3, to be discharge from the port 54, instead of being moved to the left by the movement of the screw 45 relative to the surface 51. On the other hand, the bulk of the fish solids are thrown outwardly against the inner wall 51 of rotor 42, where, due to the movement of screw 45 relative to wall 51, they are impelled to the left as seen in Figure 3 and discharged at port 56. It will be noted that the latter materials travel inwardly radially in their movement to discharge port 56, and as their radial distance from the axis of rotation decreases, they eventually are separated from water, oil and finely divided solids. Throughout the remaining distance of their travel to discharge port 56, they are subjected to a centrifugal separating or "wringing" action whereby residual water and oil tend to separate from the solids being impelled, and flow back to the right as seen in Figure 3.

Thus liquids and unseparated solids flow toward a zone 53 at the large end of the rotor 42 and are discharged through liquid discharge ports 54, of which there may be any desired number spaced circumferentially. Solids separated from the liquids by centrifugation are impelled longitudinally of the rotor 42 by the impeller 44 to a zone 55 of the rotor which is closer to the axis of rotation than the level of the liquid in the rotor. Separated solids are discharged from the rotor through ports 56 in the rotor wall, of which there may be any desired number spaced circumferentially, and collected in a section 57 of rotor housing 58. Solids may be discharged from the machine through a hopper 59 at the bottom of the section 57 of the housing. The mixture of liquids and unseparated solids, discharged from the rotor through the ports 54, is collected in a section 60 of the rotor housing 58 and discharged from a hopper 61 located underneath this section 60.

Figure 4:
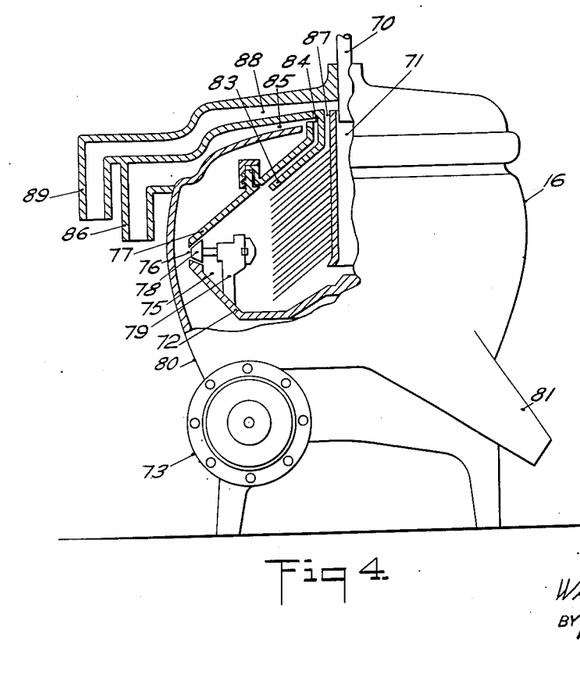
Figure 4 is a view with parts cut away and parts in section of another type of centrifugal machine which may be employed in the process of the invention, and Figures 5a and 5b together comprise a flow sheet illustrating another adaptation of the invention to a continuously operating closed system.

Centrifugal machine 16 (centrifugal machine 27 being similar) is of well-known design and construction and is more particularly illustrated in Figure 4. However, it is to be understood that centrifugal machine 16, or is equivalent, as described and/or illustrated in the drawings, may be of any other suitable design and/or construction capable of similarly processing the material fed thereto, many of which naturally will occur to persons skilled in the art, and to designers and others in the general field to which these and similarly functioning centrifugal machines pertain. A part or all of this processing may take place in one or more than one machine, as desired, and of the same or different design, construction and/or operation whether batchwise, semi-continuous, continuous, or otherwise. Thus my invention pertains to a process, and not to any particular machine or machines useful in accomplishing my purpose.

Referring now to Figure 4, the centrifugal machine 16 is illustrated with an inlet connection 70 through which the mixture of liquids and solids, for example, from conduit 14, may be fed into a feed section 71 of a bowl 72, with or without added water, for example, from conduit 17. The bowl 72 may be driven from a suitable source of power such as an electric motor illustrated at 73. The mixture of liquids and solids passes downwardly through the feed section 71 and outwardly into the zone of separation of the bowl 72. Solids which are separated from the liquids by centrifugation collect in a peripheral zone 75 of the bowl 72, and, as illustrated, are discharged therefrom through port 76, of which there may be any desired number spaced circumferentially, in wall 77 of the bowl 72. The ports 76 may be equipped with valve closure members, as illustrated at 78; or ports 76 may remain open at all times. In the latter case ports 76 conveniently would take the form of nozzles positioned tangential to the periphery of the bowl with the port openings facing backwards with respect to the direction of rotation, and of a size so as to permit solids to be discharged without the discharge of an inordinate amount of liquid. The size of the ports might be made adjustable for this purpose.

A valve motor is illustrated at 79 for operating valve closure member 78, such as, by way of opening port 76 intermittently and automatically as the level of solids rises to a predetermined height from the wall of the bowl, so as to discharge solids from the bowl 72 as and when desired.

A housing 80 collects solids thus discharged from the bowl 72, and discharges them from the machine through an opening or chute 81.

Liquids pass upwardly through the separating zone of the bowl 72 while under centrifugal force to a dividing cone or disc 83.

The heavier liquid passes around the outer end of cone 83, and moves upwardly to a discharge zone 84. The heavier liquid, such as water with dissolved protein, is then discharged from the zone 84 into a collector 85 which directs the liquid out through the conduit 86.

The lighter liquid, such as fish oil, passes up the inner side of the cone 83 and to a zone 87 of discharge. Liquid is discharged from the zone 87 into collector 88, and passes from the machine through a conduit 89.

While the centrifugal machines particularly described above may be used conveniently in the process of the invention, it is to be understood that other centrifugal machines which perform the same or similar functions may be employed without departing from the spirit of the invention.

Furthermore, while the re-treatment steps of Figure 2 may be carried out in separate centrifuges as described, it is to be understood that it is, of course, possible to provide storage tanks which will permit holding solids from the first centrifugal machine, and solids and water from the second centrifugal machine, until they can be re-treated in the first and second centrifugal machines at a time when fish are not being initially processed through these two machines, thus eliminating the duplication of machines.

Centrifugal machines of the general type suitable for the separations accomplished by centrifugal machines 16 and 27 of Figures 1 and 2 (and centrifugal machine 138 of Figure 5b) are disclosed in U. S. Patent 2,286,354, and in Chemical and Metallurgical Engineering, July 1943, page 121.

Figure 5B:
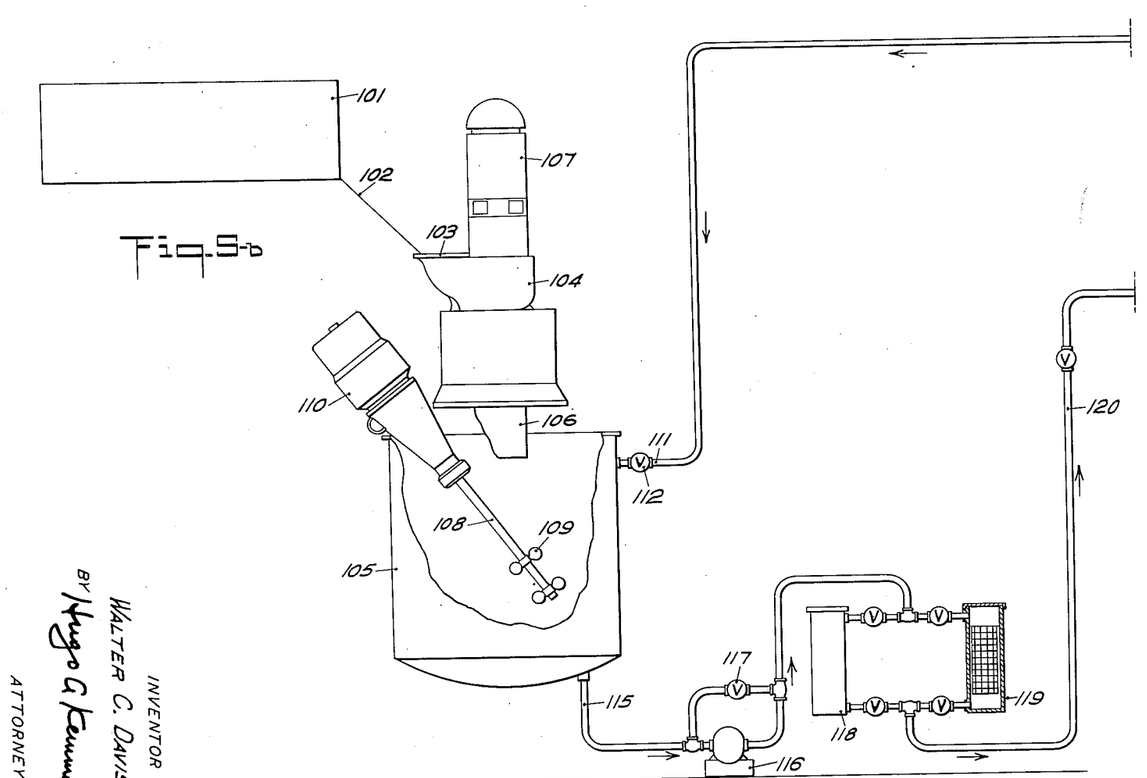

A flow diagram of an embodiment of my invention in somewhat greater detail is shown in Figures 5a and 5b. Referring now more particularly to Figure 5a at 101 is diagrammatically illustrated a cooker for receiving and cooking raw fish and/or parts thereof. Cooker 101 may be of any suitable design and construction and for this reason it is not illustrated in detail. Preferably, however, cooker 101 is of the continuous type since the process as a whole has distinct advantages from the standpoint of continuous operation. It is to be particularly noted that my process is not only excellently adapted to continuous operation but also to such operation in a completely enclosed system.

The fish after cooking are delivered through a conduit or chute diagrammatically illustrated at 102 to inlet 103 of a disintegrator 104 for the comminuting or disintegrating of the cooked fish. Disintegrator 104 may be of any design and construction suitable for the intended purpose. I find that a disintegrator operating on the centrifugal principle to be highly satisfactory, although any other type of disintegration or mill, or other device, may be employed for the comminution of the cooked fish. Preferably the fish are disintegrated to an extent so that a pumpable slurry of the same may be formed in the slurry tank 105 to which the disintegrated mass is delivered from disintegrator 104 through discharge conduit 106. A prime mover for disintegrator 104 is illustrated diagrammatically at 107 and conveniently may be an electric motor.

To maintain the disintegrated fish in the form of a slurry in slurry tank 105, an agitator 108 is provided having one or more agitating blades 109 which are conveniently driven by an electric motor illustrated diagrammatically at 110.

Water is usually added to the slurry tank 105 in quantity sufficient to produce a readily pumpable slurry. In order to produce a meal of relatively high protein content, I prefer to employ for slurry making purposes, a part of the water containing protein in solution and recovered at a later stage in the process. This water because of its contained protein and suspended meal is referred to hereinafter for convenience by the more or less conventional term "stick-water." As illustrated, stick-water enters slurry tank 105 through conduit 111, the flow being controlled by a valve illustrated diagrammatically at 112, which may be manually or automatically operated, as desired.

Slurry tank 105, as shown, is connected to conduit 115 which connects to the inlet of pump 116 which may be of any suitable type. Thus pump 116 may be a gear pump which, as illustrated, is provided with a pressure relief valve 117, which may open automatically to return a part of the slurry from the outlet to the inlet of the pump in the event that the pressure at the outlet should build up to a level higher than desired. The construction and operation of relief valves of this character are well known in the art and therefore will not be described in detail.

At 118 and 119 are illustrated alternate strainers for the straining from the slurry of any possible large pieces of fish which might have survived the disintegrator 104 and the slurry tank 105. Strainers 118 and 119 may be of conventional design and construction and operation for the purposes intended. For example, they may be provided with open mesh filter screens of which the individual openings may have any desired dimensions, such, as approximately from ½" x ½" to ¾" x ¾". Meshes having dimensions approximately of ⅝" x ⅝" (.624" x .624" for example) are found to be very suitable. While one of the strainers 118 or 119 is in operation, the other may be opened for cleaning, and since the operation of the valves illustrated to effect this purpose will become at once apparent to the person skilled in the art, such operation for purposes of brevity will not be described in detail.

The slurry, after being pumped through one of the strainers 118 or 119, passes through conduit 120 to centrifugal machine 121, whose function is similar to that of centrifugal machines 12 and 25 of Figures 1 and 2, and which may be of the general type of the centrifugal machine illustrated in detail in Figure 3. As previously pointed out, in the commercial adaptations of centrifugal machines of this type, the liquid discharge ports 54 are radially adjustable. In other words, the radial distance of the discharge ports 54 from the axis of rotation is made adjustable.

Since, when the centrifugal machine is in operation, the width of the inner wall of the liquid in the direction of (that is parallel to) the axis of rotation is determined by the radial position of the liquid discharge ports 54, it follows that this width may be increased by decreasing the radial distance of the discharge ports 54, and vice versa. For convenience in description, this liquid layer will be referred to as the "pond," and the portion of the rotor 42 to the left, as seen in Figure 3, and not covered by the pond, will be referred to as the "beach." Thus, as seen in Figure 3, the division between the pond and the beach is more or less generally illustrated by the dotted line 122, it being understood that the space radially outward from the dotted line 122 is occupied by the pond.

It is preferred to adjust the liquid discharge ports of centrifugal machine 121 so as to maintain a relatively wide beach as compared to the width of the pond, so as to accentuate in centrifugal machine 121 the separation of solids relatively free from liquids, this being accomplished by not only lengthening the relative time of the so-called wringing action on the solids, but also by starting the wringing action at a point along the inner wall 51, of conical rotor 42, at which relatively greater centrifugal forces are generated. Thus, it is preferred to have the width of the pond (measured parallel to the axis of rotation) less than ½ of the distance, as projected on to the axis of rotation, from the liquid discharge port 54 to the solids discharge port 56.

Solids are discharged from centrifugal machine 121 into conduit 123 which, as illustrated, in turn discharges into a screw conveyor, diagrammatically illustrated at 124.

Liquids, that is water and oil, containing very finely divided fish solids, are discharged from centrifugal machine 121 through conduit 125 into funnel 126 which may be closed, if desired, and from which the liquids are pumped by pump 127 (which may be similar to pump 116 with appurtenances) to and into centrifugal machine 128 which in construction may be in all respects similar to centrifugal machine 121. The adjustment of centrifugal machine 128, as contrasted to adjustment of centrifugal machine 121, is preferably such as to accentuate the separation of liquids from solids, that is liquids relatively free from solids, and accordingly the liquid discharge ports 54 are adjustably positioned closer to the axis of rotation, so as to maintain a somewhat wider pond than is maintained in centrifugal machine 121. Thus the width of this pond may be greater than ½ of the distance, as projected on to the axis of rotation, from liquid discharge port 54 to solids discharge port 56. Preferably, in centrifugal machine 121 the beach is relatively wide and the pond relatively narrow, whereas in centrifugal machine 128 the beach is relatively narrow and the pond relatively wide.

Solids are discharged from centrifugal machine 128 through conduit 129 into the conveyor 124. In view of the preferred adjustment of centrifugal machine 128 as compared to centrifugal machine 121, these solids will contain a somewhat higher (though still relatively low) percentage of residual oil than the solids discharged through conduit 123 from centrifugal machine 121. However, the percentage of solids from centrifugal machine 128 is relatively low as compared to the solids from centrifugal machine 121, so that the oil increase in the overall meal is relatively small.

Liquids are discharged from centrifugal machine 128 through conduit 130 into funnel 131 which, like funnel 126, may be closed, if desired, though, in the case of either funnel, this need not be resorted to and is more or less a matter of choice. The liquids are pumped from funnel 131 by pump 133 into feed tank 134, it being understood that these liquids still contain some extremely finely divided fish solids.

Pump 133 may be of any suitable design and construction, and as illustrated, is of the centrifugal type.

The mixture of water, fish oil and extremely finely divided solids is preferably reheated in feed tank 134. Heat may be supplied by any suitable means such as through a steam coil disposed within the tank, a steam jacket about the tank, or otherwise. A connection for supplying steam is illustrated at 135.

The reheated mixture from tank 134 is delivered through conduit 136, controlled by valve 137, to the inlet of centrifugal machine 138, of a design, construction and operation, which may be in all respects similar to centrifugal machines 16 and 27 of Figures 1 and 2, and illustrated in detail in Figure 4, with or without the suggested modifications with respect to the discharge nozzles, etc.

Fish oil separated in centrifugal machine 138 is discharged therefrom through conduit 140, which may lead to a storage tank, or to any other desired point such as for polishing or refining, not shown.

Water separated in centrifugal machine 138 is discharged through conduit 141, and separated fish meal (with some water) through conduit 142. As illustrated, conduits 141 and 142 connect with conduit 143 which leads to stick-water tank 144.

As pointed out previously, a part of the stick-water is preferably recycled through conduit 111 to slurry tank 105 (or to cooker 101), or otherwise. For this purpose, pump 145 having an inlet connection 146 positioned inside of tank 144 and an outlet connection 147 joined to conduit 111, is provided. Pump 145 may be of any suitable type, and as illustrated, is a centrifugal pump.

That portion of the stick-water that is not recycled, flows from tank 144 through outlet 148, which, if desired, may lead to an evaporator, not shown, for evaporation of water and the recovery of concentrated protein liquor, or it may be otherwise disposed of, such as discarded.

It will, of course, be understood that the meal delivered through conduits 123 and 129 to conveyor 124, may be delivered by the conveyor 124 to a drier, not shown, for the production of dry meal ready for packaging, such as in bags.

It is, of course, understood that any type of fish may be treated by my process. Typical types of fish which are currently processed in large volume for the recovery of fish oil and fish meal are sardine, pilchard, herring, salmon, menhaden, rose fish, etc. Fish reduction operations are frequently carried on in conjunction with canning operations, the waste from the canning plant, called offal, being sent to the fish reduction plant for the recovery of fish oil and meal therefrom. Whole fish may also be reduced in such plants. Fish livers may also be reduced in this manner.

The advantages of my process over prior art processes, include a relatively high recovery of available fish oil (such as up to 97%, and more of the oil content of the fish material processed).

as well as a relatively high recovery of available fish meal (such as up to 99% and more of the meal content of the fish material processed). Furthermore, my process may be operated continuously in a closed and balanced system, requiring a minimum of operating personnel, which is a decided economic advantage. Moreover, meal produced by my process has a relatively high protein content, and a relatively low oil content, as compared to meal produced by the usual prior art processes, and without the use of solvent extraction. There is no danger of the presence of residual solvent in the meal produced by my process, and consequently, meal produced by my process has greater appeal from the standpoint of hog, cattle and poultry feed.

Then too, regardless of the type, age or other characteristics of the fish being handled, my process requires a minimum of adjustment, if any, to adapt it to the particular fish (which term includes offal and livers thereof) being handled. A screw press on the other hand, requires constant adjustment to adapt it to the type, age or other characteristics of the fish being handled. Also in the case of a screw press (but not in my process) the cooker requires constant adjustment to maintain a cooked fish of a consistency that will allow proper pressing in the screw press.

It is, of course, well understood in the art, that the oil content of fish varies not only with the species of fish, but also with the seasons of the year and other factors. Consequently, the following example of the operation of my process is to be regarded as merely illustrative, and is subject to wide variation, depending not only upon variations in fish, but also in the results which may be desired, as well as other factors.

By way of illustration, it is assumed that the plant is designed to handle five tons of fish (which term includes offal and livers) per hour, and that the average analysis of the fish is 55% water, 20% meal and 25% oil. Accordingly, the feed to cooker 101 will be at the rate of 10,000 pounds of fish per hour. It is assumed that the fish are cooked by direct steam, and that due to the condensation of steam, 3500 pounds of water per hour are added to the fish in the cooker 101, so that the feed to disintegrator 104 and into slurry tank 105 is at the rate of 13,500 pounds per hour. In this illustrative example, stick-water is added to slurry tank 105 through conduit 111 at the rate of 3000 pounds per hour, making the rate of discharge from slurry tank 105 through conduit 115, pump 116, one of the strainers 118 and 119 and conduit 120 into centrifugal machine 121, 16,500 pounds per hour; this feed analyzing 12,000 pounds of water, 2500 pounds of oil, and 2000 pounds of meal.

In this illustrative example, the solids discharged from centrifugal machine 121 through conduit 123 and into conveyor 124, analyze on an hourly basis as follows: 1669 pounds of meal on a dry basis, 1702 pounds of moisture in the meal, and 33 pounds of oil in the meal, or 2% based on dry meal.

Accordingly, liquor is delivered from centrifugal machine 121 through conduit 125, funnel 126, pump 127 to and into centrifugal machine 128 at the rate of 13,096 pounds per hour; this feed analyzing 10,298 pounds of water, 2467 pounds of oil and 331 pounds of meal.

Since centrifugal machine 128 is being operated as a liquid clarifier, as distinguished from centrifugal machine 121, which is being operated as a solids press, the solids discharged from centrifugal machine 128 through conduit 129 and into conveyor 124, will run somewhat higher in liquid content, and in this illustrative example, the analysis, on an hourly basis, is as follows: Meal 306 pounds, moisture in meal 460 pounds, and oil in meal 9 pounds or 3% of the meal on a dry basis. It will be noted that while this meal has a somewhat higher oil content, the amount of meal is relatively small compared to the meal delivered through conduit 123.

As a result of the separation of these solids, the flow of liquor from centrifugal machine 128 through conduit 130, funnel 131 and pump 133 to reheat feed tank 134, will be at the rate of 12,321 pounds per hour, this liquor analyzing on an hourly basis, 9838 pounds of water, 2456 pounds of oil, and 25 pounds of meal. This liquor, after reheating say to a temperature of about 200 to 210° F., is fed through conduit 136 into centrifugal machine 138, at the rate at which it enters tank 134.

Oil is discharged from centrifugal machine 138 through conduit 140 at the rate of 2422 pounds per hour. Since the rate of feed of oil in the fish in this illustrative example is 2500 pounds per hour, this represents a recovery of oil of 97%.

By the use of my process a highly valuable fish oil may be produced. The residual water content may be readily brought to below 2% by weight and lower such as below 1% by weight. Residual meal, for practicable purposes, may be susbtantially completely removed, having in mind the tolerances permitted in the art for a saleable product. The oil may be used as such, or it may be subjected to "polishing" operations for further refinement for which it is ideally suited.

From the above figures it will be seen that meal is fed to centrifugal machine 138 at the rate of 25 pounds per hour. This meal (with some accompanying water) is separated in centrifugal machine 138, and discharged through conduits 142 and 143 into stick-water tank 144 along with the water discharged from centrifugal machine 138 through conduit 141. Of this 25 pounds per hour of meal, 6 pounds per hour is recycled, along with stick-water, back to slurry tank 105. Thus, meal is withdrawn from tank 144 through outlet 148, along with stick-water, at the rate of 19 pounds per hour. Assuming that the latter stick-water is not evaporated to recover its meal and protein content, the total loss of meal from the system is at the rate of 19 pounds per hour, making the total meal recovered at conveyor 124, 1981 pounds per hour. Since the feed of meal in the fish is at the rate of 2000 pounds per hour, this represents a recovery of meal of 99%.

It will be understood by those skilled in the art, that in view of all of the possible variables, not only in the composition of the fish, but also in the adjustment and operation of the various pieces of equipment involved, as well as otherwise, the operation, as illustrated by the example, will rarely be exactly reproduced. Furthermore, depending upon requirements, the operator may not wish to operate the process to exactly reproduce the results of the illustrative example. It is, therefore, to be understood that changes, omissions, additions, substitutions and/or modifications might be made without departing from the spirit of the invention.

As pointed out above, an outstanding advantage of this invention is that the use of a screw press for initially pressing the fish is dispensed with. However, if desired for any reason, a screw press might be employed in conjunction with my invention. Thus, a screw press could be inserted between the cooker 10 and the centrifugal machine 12 of Figure 1, while retaining certain of the advantages of my invention, since the liquor derived from a screw press during fish reduction operations invariably contains a very substantial quantity of fish solids. These fish solids may be more advantageously recovered from the screw press liquor by the employment of my invention than by prior art methods. Thus, such screw press liquor might be fed first into centrifugal machine 12 of Figure 1 for the initial separation of solids, and then into centrifugal machine 16 of Figure 1 for the separation of remaining solids, and, if desired, the solids and water effluents from centrifugal machine 16 combined with the solids effluent from centrifugal machine 12 might be processed in the manner illustrated in Figure 2. Then too, the liquor from a screw press might be treated as illustrated in Figure 5, although it will be seen from the nature of the recoveries of oil and meal, that the use of a screw press is non-essential.

By recycling the stick-water through conduit 111 in Figure 5, for use in the slurry tank 105 instead of fresh water, for the production of a flowable slurry, the protein and meal (and any residual oil) in the stick-water are recycled through the system. This results not only in the recovery of more meal, (and oil), but also of meal with a substantially higher protein content. Although the recycled meal is extremely finely divided, and has passed through the centrifugal machine 128, in view of its intermixture with the fresh feed, a very substantial part of this meal deposits upon and is recovered with the meal of the freshly fed cooked fish.

Any desired and suitable temperature or temperatures may be employed in the various parts and steps of my process, and the same applies to pressure or pressures. In the embodiment of the invention illustrated in Figures 5a and 5b, I prefer to have the mixture in slurry tank 105 at a temperature such that the temperature of the influent into centrifugal machine 121 will be within at least the broadest range given above for the feed to centrifugal machine 12. I also prefer that the influent into centrifugal machine 128 shall be at a temperature at least within such broadest range. If found necessary, heat insulation may be provided to effect this purpose, and/or a reheater may be installed between centrifugal machines 121 and 128, or other provisions may be made. However, ordinarily and depending somewhat on design, the materials pass through these two machines at such a rate so that very little loss of heat is experienced between slurry tank 105 and reheat tank 134.

When stick-water is recycled the application of external heat to slurry tank 105, or otherwise, is usually unnecessary for the stick-water is usually quite warm. However, a steam coil or heating jacket, or other means may be provided for supplying heat to slurry tank 105, if desired.

On the other hand, since the disintegrated cooked fish may be still quite hot upon entering slurry tank 105 from disintegrator 104, and since the recycled stick-water is usually quite warm, it may become necessary or desirable to cool the slurry in slurry tank 105, in which case the same provision may be made, or if already made then used, for the circulation of cold brine, or other cooling medium, through the coil and/or jacket, or other provision for cooling may be made.

As noted above, when separating fish oil from water such as in centrifuges 16, 27 and/or 138, I usually prefer that the feed liquor be relatively hot, such as, at least 180° F. and more particularly at least 190° F. or 200° F. Also, as noted above, boiling is considered the practicable upper limit which at atmospheric pressure is in the neighborhood of 212° F. Should elevated pressure be employed the boiling temperature would, of course, be correspondingly raised. On the other hand, it would be correspondingly reduced in the case of reduced pressures.

The centrifuging of the bulk of the meal after its separation from contact with the liquids such as is accomplished in centrifugal machines 12, 25, 121 and 128 of the drawings, is preferably under conditions including centrifugal force as to reduce the oil content of the meal based on dry meal to at least 4%, and more preferably to at least 3%, such as to at least 2%. It will be noted in the illustrative example that the oil content on a dry basis of the fish solids discharged from centrifugal machine 121 through conduit 123 is reduced to at least 2% and that the oil content on a dry basis of the fish solids discharged from centrifugal machine 128 through conduit 129 is reduced to at least 3%. It is also preferred that this centrifuging and separation of fish solids from liquids be such as to reduce the concentration of fish solids in the liquid effluents from these machines, that is in this step of the process, wherein solids are brought out of contact with liquids and separately centrifuged, to at least 5%, such as to at least 3%, or 2%, or even to at least 1%, or 0.5%, for it is by the separate centrifuging of the fish solids out of contact with the main body of the liquids that a low oil content in the fish meal is primarily obtained. Since the oil thus separated from the meal is added to the main body of the separated liquids which comprise the effluent from the first stage of the process and the influent into the second stage of the process, it follows that oil recoveries are increased with decrease in the oil content of the separately centrifuged meal and with decrease in the solids content of the liquid effluent from the first stage of the process.

It will be noted in the illustrative example that the solids content of the liquid effluent flowing from centrifugal machine 121 through conduit 125 is reduced to at least 3% and that the solids content of the liquid effluent flowing from centrifugal machine 128 through conduit 130 is reduced to at least 0.2%.

Moreover, a low solids content in the combined aqueous effluents from the second stage of the process, for example, from centrifugal machine 16 of Figure 1 or from centrifugal machine 27 of Figure 2 or centrifugal machine 138 of Figure 5b, is advantageous when these combined aqueous effluents are to be treated in an evaporator, and particularly in an evaporator of the tubular type, for the production of a concentrated protein-containing liquid, since the lower such solids content, the less likely it is that difficulty will be experienced with clogging of the evaporator.

While reference has been made to the discharge of some water along with the separated fish solids in the second stage separation steps, that is from centrifugal machines 16, 27 and 138 of the drawings, it is to be understood that the percentage of water discharged along with these solids is not particularly critical as long as effective separation of fish oil is effected. In the ordinary operation of centrifugal machines of this type, the separated effluent containing the solids ranges from 20 to 30% of the total feed, such as 25%, and the percentage of solids in this effluent in ordinary operation is less than 5 or 6%, such as for example, approximately 1%. It will be understood that the other aqueous effluent which is discharged forms a barrier during the separation between the separated fish oil and the aqueous effluent containing the separated solids.

However, and as above pointed out, it is to be understood that any other type of centrifugal machine suitable for effecting this separation may be employed, and it is conceivable that when the solids content in the influent is reduced to an extremely low value by the previous processing, that a continuous discharge of solids from the bowl might be dispensed with and that these solids may be permitted to build up on the inner wall of the bowl and periodically removed as is common in certain types of solids separation.

Centrifugal machines 12, 25, 121 and 128 may, of course, be of any suitable size, design, construction and mode or theory of operation, and while the use of a conical bowl, as illustrated, is convenient, it is to be understood that the bowl may have any other shape and/or interior design and construction, suitable to effect the intended purpose. Thus merely for purposes of illustration, a typical machine of the type shown and particularly described has a frusto-conical bowl which is approximately 22 inches long in the direction of its axis, is approximately 14 inches in diameter at its large end and is approximately 8 inches in diameter at its small end. In this machine the bowl normally rotates at a speed of 3250 revolutions per minute.

Likewise, and as pointed out above, the bowls of centrifugal machines 16, 27 and 138 of the drawings may, of course, be of any suitable size, design, construction and mode or theory of operation, and while a particular bowl has been illustrated and particularly described, it is to be understood that the bowl may have any other shape and/or interior design and construction, suitable to effect the intended purpose. Thus merely for purposes of illustration, a typical machine of the type shown and particularly described has an inside diameter between discharge ports of approximately 17 inches with the outer diameter of the disc stack approximately 11 inches. The bowl normally is rotated at a speed of approximately 6000 revolutions per minute.

The various pumps will, of course, be of capacities and will operate at speeds calculated to effect the desired flow of materials, as will become apparent to persons skilled in the art, upon becoming familiar herewith.

The degree to which the fish are cooked for purposes of separation, is well understood in the art, and as pointed out above, my process permits a wide latitude in the degree of cooking. A typical guide at present generally employed in the art for sufficient cooking, is to hold a cooked fish by its tail and to consider the fish suitably cooked, if, upon wiggling, all of the meat falls away from the backbone, leaving very little or no red coloration as evidence of blood. Cooking may, of course, be effected in any manner whatsoever.

While my process has been more particularly described in connection with the processing of fish as originally cooked, it is to be understood that it can be applied to the reprocessing of oil-containing fish meal for the recovery of oil therefrom, such as the fish meal press cake from prior art processes in which a screw press is employed. This meal may be mixed with water which may be ordinary water or more preferably stick-water and the press cake disintegrated to form a slurry. The percentage of solids in the slurry in such case is preferably limited as herein more particularly described as preferred in the case of originally cooked fish and such slurry would be otherwise processed, the same as the slurry of the originally cooked fish as more particularly described herein. Preference is given to temperature ranges, solids contents of effluents and influents, oil contents of effluent solids, etc., all as herein more particularly described. In this manner, the oil content of relatively high oil content meal may be effectively reduced to produce a meal of increased feed value and to recover additional oil from the original meal.

While my invention has been particularly described in connection with the problem of separating into its component parts a difficulty separable intermixture of fish solids, fish oil and water, it is to be understood that my invention may be applied to the solution of similar problems in connection with other materials. In the case of fish, the difficulties of separation are greatly enhanced due to the presence of an emulsion of water and fish oil, which emulsion is made much more difficult to break due to the presence of fish solids. In the above particular description, it will be noted that prior to my separation of water and fish oil from each other by centrifugal force, I reduce the concentration of fish solids very materially, leaving only a small percentage of finely divided fish solids in the water-fish oil emulsion prior to the separation by centrifuging of the emulsion into its component parts. During this latter centrifuging step, these residual solids are separated, which also contributes to the ease of breaking the water-fish oil emulsion in the same operation.

It will be understood that while certain arrangements of apparatus have been particularly described in connection with the figures of the drawings, other arrangements involving omissions, additions or otherwise, may be employed without departing from the spirit of the invention. Furthermore, features particularly described in connection with certain figures of the drawings may be embodied in other figures of the drawings if desired. For instance, in Figure 1 or in Figure 2, additional provision may be made for the disintegration of the fish and/or the formation of a slurry between the cooker 10 and the centrifuge 12, such as that illustrated in Figure 5a. Furthermore, it will be obvious to persons skilled in the art upon becoming familiar with my invention that all of the water that it is desired to have present in the process may be added at the cooker 10 in Figures 1 and 2, leaving the addition of water at 17 entirely optional. Moreover, temperature may be adjusted by heating, or cooling (if necessary or desired), at any desired point such as between the cooker 10 and the centrifuge 12 of Figures 1 and 2, between the centriguge 12 and the centrifuge 16 of Figures 1 and 2, at or near the remixing tank 23 of Figure 2, and/or between the centrifuge 25 and the centrifuge 27 of Figure 2.

Then, too, since the percentage of meal discharged by the centrifuge 16 of Figures 1 and 2, and particularly by the centrifuge 27 of Figure 2 and still more particularly by the centrifuge 138 of Figure 5b is relatively small, the separate discharge of water and meal from the centrifuges is not essential, particularly when the water and meal is to be discarded or not further processed in whole or in part, or when the water and meal are to be re-processed together in whole, as illustrated in Figure 2 after re-mixing tank 23, or in part, as illustrated by the recycle of a part of the stick-water in Figures 5a and 5b. Thus while an evaporator for protein recovery is illustrated at 31 in Figure 2, it will be understood that this is not essential and may not even be preferred in many instances, particularly in view of the reduced percentage of meal and the reduced percentage of protein in the water discharged from the centrifuge 27 due to the reprocessing beginning at the remixing tank 23.

Likewise one or more strainers such as illustrated at 118 and 119 in Figure 5a may be incorporated at any desired point, such as, between cooker 10 and centrifuge 12 of Figure 1 or Figure 2, and while two centrifugal machines 121 and 128 have been shown in Figure 5b, it will be understood that any number of such centrifugal machines may be employed in effecting this step of the process, such as one or more, and in series, or in parallel, or both, with any desired or suitable radial adjustment of the discharge ports illustrated at 54 in Figure 3. The same applies to the step of the process effected by centrifugal machines 16 and 138, or centrifugal machine 27.

For instance, centrifugal machine 121 in Figure 5b may be duplicated with the feed through line 120 divided between the two machines, and the combined liquid effluents from these two machines may be fed to centrifugal machine 128. Such an arrangement has the advantage of increased capacity. This is because in Figure 5b the major work of separating solids is done by machine 121. By duplicating this machine as suggested, such solids may be separated at a faster rate. Machine 128 is capable of handling the reduced solids content present in the combined effluents.

Any desired or suitable means may be employed for the application or regulation of heat at any desired point, the means shown and/or described being largely for purposes of illustration.

Other changes, omissions, additions, substitutions and/or modifications and apparatus suitable therefor in the practice of my process will become apparent to persons skilled in the art upon becoming familiar with my invention. Therefore it is to be understood that the above particular description is by way of illustration, and that the invention is not to be limited other than by the scope of the claims.

I claim:

1. A process for removing fish oil from fish solids, comprising subjecting an aqueous slurry of said fish solids to a centrifugal force sufficient to separate solids from liquids, subjecting said separated solids to a centrifugal force sufficient to separate residual liquids therefrom, combining said separated residual liquids with said first-mentioned separated liquids, thereafter subjecting said separated liquids to a centrifugal force sufficient to separate said liquids into water and oil phases, and removing said separated oil and water phases in separate streams from said last centrifuging step.

2. A process for the treatment of cooked fish for the separation of said cooked fish into meal, oil and water, comprising subjecting said cooked fish to centrifuging under a centrifugal force sufficient to separate said cooked fish into two components, one of said components comprising fish solids containing some water and oil and the other of said components comprising water and oil containing some finely divided fish solids, subjecting said separated fish solids to centrifuging under a centrifugal force sufficient to separate additional oil and water therefrom, combining said last-mentioned separated water and oil with said second-mentioned component comprising water, oil and finely divided fish solids, thereafter subjecting said second-mentioned component to centrifuging under a centrifugal force sufficient to separate said second-mentioned component into at least two phases, one of said last-mentioned phases comprising fish oil, and separately removing from said last-mentioned centrifuging step said separated fish oil phase.

3. A process for the treatment of cooked fish for the separation of said fish into fish meal, fish oil and water, comprising forming a slurry thereof with added water under conditions such that said slurry contains at least approximately 10 lbs. of added water per 100 lbs. of original raw fish, subjecting said slurry at a temperature between approximately 90° F. and 170° F. to centrifuging under a centrifugal force sufficient to separate said slurry into a solids component comprising fish solids containing some water and oil and a fluids component comprising water and oil containing some finely divided fish solids, thereafter continuing the application of centrifugal force to said solids component while out of contact with said fluids component to separate additional oil and water therefrom, returning said additionally separated water and oil to the zone of original separation, separately removing from the foregoing centrifuging step said solids component and said fluids component as finally separated therein, approximately thereafter subjecting the separated fluids component to centrifuging at a temperature between approximately 180° F. and 215° F. under a centrifugal force sufficient to separate said fluids component into at least two phases, one of said last-mentioned phases comprising water and fish solids, and another of said last-mentioned phases comprising fish oil, and separately removing from said last-mentioned centrifuging step said phases as finally separated therein.

4. The process of claim 3 in which an admixture of the finally separated fish solids and water is recycled and employed in the formation of the slurry.

5. A process for the treatment of cooked fish for the separation of said fish into fish solids, fish oil and water, comprising forming a slurry thereof with added water under conditions such that said slurry contains at least approximately 30 lbs. of added water per 100 lbs. of original raw fish and such that at least 95% of the fish solids will pass through a screen having square openings with dimensions of .625" by .625" but less than 5% will pass through a screen of 250 mesh, subjecting said slurry at a temperature between approximately 120° F. and 150° F. to centrifuging under a centrifugal force sufficient to separate said slurry into a solids component comprising fish solids containing some water and oil and a fluids component comprising water and oil containing some finely divided fish solids, thereafter continuing the application of centrifugal force to said solids component while out of contact with said fluid component to separate additional oil and water therefrom, returning said additionally separated water and oil to the zone of said first-mentioned separation, separately removing from the foregoing centrifuging step said solids component and said fluids component as finally separated therein, thereafter subjecting the separated fluids component to centrifuging at a temperature between approximately 200° F. and 210° F. under a centrifugal force sufficient to separate said fluids component into at least two phases, one of said last-mentioned phases comprising water and fish solids, and another of said last-mentioned phases comprising fish oil, separately removing from said last-mentioned centrifuging step said phases as finally separated therein, and employing an admixture of the fish solids and water separated in said last-mentioned centrifuging as a source of added water in the formation of said slurry.

6. A process for the treatment of cooked fish for the separation of said fish into fish meal, fish oil and water, comprising forming a slurry thereof with added water under conditions such that said slurry contains at least approximately 30 lbs. of added water per 100 lbs. of original raw fish, subjecting said slurry at a temperature between approximately 130° F. and 160° F. to centrifuging under a centrifugal force sufficient to separate said slurry into a solids component comprising fish solids containing some water and oil and a fluids component comprising water and oil containing some finely divided fish solids, and thereafter continuing the application of centrifugal force to said solids component while out of contact with said fluids component to separate additional oil and water therefrom, returning said additionally separated water and oil to the zone of said first-mentioned separation, separately removing from the foregoing centrifuging step said solids component and said fluids component as finally separated therein, thereafter subjecting the separated fluids component to centrifuging at a temperature between approximately 200° F. and 210° F. under a centrifugal force sufficient to separate said fluids component into three parts, one of said last-mentioned parts comprising protein-containing water, another of said last-mentioned parts comprising an admixture of water and fish solids containing residual oil, and another of said last-mentioned parts comprising fish oil, separately removing from said last-mentioned centrifuging step said phases as finally separated therein, and recycling an admixture of fish solids and water derived from said last-mentioned centrifuging for use as the source of added water in the formation of said slurry, the amount added being based upon the liquid component of said last-mentioned admixture.

7. A process for the treatment of fish oil containing fish meal for the separation of said fish meal into fish meal of reduced oil content and fish oil, said first-mentioned fish meal containing more than 4% by weight of fish oil, comprising forming a slurry of said fish meal with added water under conditions such that said slurry contains not more than approximately 18% by weight of fish solids, subjecting said slurry at a temperature between approximately 90° F. and 170° F. to centrifuging under a centrifugal force sufficient to separate said slurry into a solids component comprising fish solids containing some water and oil and a fluids component comprising water and oil containing some finely divided fish solids, thereafter continuing the application of centrifugal force to said solids component while out of contact with said fluids component to separate additional oil and water therefrom, returning said additionally separated water and oil to the zone of said first-mentioned separation, separately removing from the foregoing centrifuging step said solids component and said fluids component as finally separated therein, thereafter subjecting the separated fluids component to centrifuging at a temperature between approximately 130° F. and 215° F. under a centrifugal force sufficient to separate said fluids component into at least two phases, one of said last-mentioned phases comprising water and fish solids, and another of said last-mentioned phases comprising fish oil, and separately removing from said last-mentioned centrifuging step said phases as finally separated therein.

8. The process of claim 7 in which an admixture of the finally separated fish solids and water is recycled and employed in the formation of the slurry.

9. A process for the treatment of cooked fish livers for the separation of said fish livers into fish meal and fish oil, comprising forming a slurry thereof with added water under conditions such that said slurry contains not more than 18% by weight of fish solids, subjecting said slurry at a temperature between approximately 90° F. and 170° F. to centrifuging under a centrifugal force sufficient to separate said slurry into a solids component comprising fish solids containing some water and oil and a fluids component comprising water and oil containing some finely divided fish solids, thereafter continuing the application of centrifugal force to said solids component while out of contact with said fluids component to separate additional oil and water therefrom, returning said additionally separated water and oil to the zone of said first-mentioned separation, separately removing from the foregoing centrifuging step said solids component and said fluids components as finally separated therein, thereafter subjecting the separated fluids component to centrifuging at a temperature between approximately 180° F. and 215° F. under a centrifugal force sufficient to separate said fluids component into at least two phases, one of said last-mentioned phases comprising water and fish solids, and another of said last-mentioned phases comprising fish oil, and separately removing from said last-mentioned centrifuging step said phases as finally separated therein.

10. The process of claim 9 in which an admixture of the finally separated fish solids and water is recycled and employed in the formation of the slurry.

WALTER C. DAVIS.

REFERENCES CITED

The following references are of record in the file of this patent:

UNITED STATES PATENTS

| Number | Name | Date |
| --- | --- | --- |
| 1,840,715 | Hiller | Jan. 12, 1932 |
| 2,286,354 | Fitzsimmons | June 16, 1942 |

OTHER REFERENCES

Chem. and Met. Eng., July 1943, pages 120–121.